United States Patent [19]

Ueda et al.

[11] Patent Number: 5,025,844

[45] Date of Patent: Jun. 25, 1991

[54] HEAVY DUTY PNEUMATIC RADIAL TIRE HAVING DEFINED TIRE ENLARGEMENT WITH INFLATION

[75] Inventors: Hiroshi Ueda; Hisaaki Yoshigai; Mikio Masunaga, all of Kodaira, Japan

[73] Assignee: Bridgestone Corporation, Tokyo, Japan

[21] Appl. No.: 517,446

[22] Filed: Jan. 12, 1990

Related U.S. Application Data

[63] Continuation of Ser. No. 294,974, Jan. 3, 1989, abandoned, which is a continuation of Ser. No. 16,822, Feb. 20, 1987, abandoned.

[30] Foreign Application Priority Data

Feb. 20, 1986 [JP] Japan .................. 61-36454

[51] Int. Cl.$^5$ .......................... B60C 3/00; B60C 3/04
[52] U.S. Cl. ..................... 152/454; 152/544; 152/552
[58] Field of Search .............. 152/209 R, 454, 544, 152/546, 552

[56] References Cited

U.S. PATENT DOCUMENTS

| | | | |
|---|---|---|---|
| 3,910,336 | 10/1975 | Boileau | 152/454 X |
| 4,037,637 | 7/1977 | Arimura et al. | 152/454 |
| 4,076,066 | 2/1978 | Verdier | 152/454 |
| 4,082,132 | 4/1978 | Arai et al. | 152/454 X |
| 4,258,773 | 3/1981 | deSaint-Michel | 152/454 |
| 4,345,634 | 8/1982 | Giron | 152/454 |
| 4,387,758 | 6/1983 | Matsuda et al. | 152/454 |

FOREIGN PATENT DOCUMENTS

2847198A1 5/1979 Fed. Rep. of Germany .
3122190A1 3/1982 Fed. Rep. of Germany .

*Primary Examiner*—Caleb Weston
*Assistant Examiner*—Gregory J. Wilber
*Attorney, Agent, or Firm*—Sughrue, Mion, Zinn, Macpeak & Seas

[57] ABSTRACT

A heavy duty pneumatic radial tire including a pair of bead portions, a carcass consisting of one steel cord layer and extending between the bead portions, and a tread portion arranged radially outward of a crown portion of the carcass. A normal rim on which the tire is mounted has a bead seat at an angle of approximately 15° relative to a rotating axis of the tire and engaging the bead portions of the tire. During filling the tire with inner pressure from 7% to 100% of a determined maximum inner pressure of the tire, a ratio A/B of an enlargement amount A of a shoulder in radial and outward directions to an enlargement amount B of the bead portion in axial and outward directions is within 0.25-0.7, preferably 0.3-0.55, where a radial and outward displacement of a shoulder positions J on the shoulder spaced by 10 mm from each end of said tread toward an equatorial plane of the tire is taken as the enlargement amount A of the shoulder in the radial and outward directions, and an axial outward displacement of a bead position K on the bead portion at a height of 21% of a tire sectional height H from a bead heel is taken as the enlargement amount B of the bead portion in axial outward directions.

6 Claims, 5 Drawing Sheets

FIG_1
*PRIOR ART*
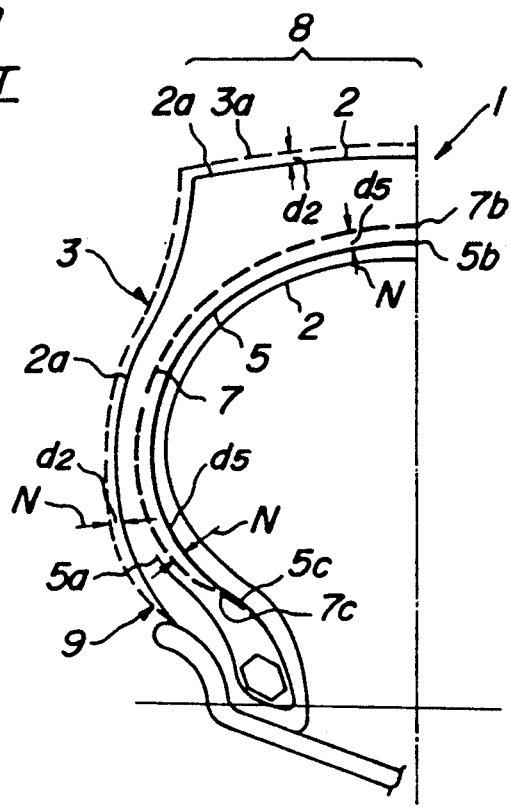
FIG_2
*PRIOR ART*
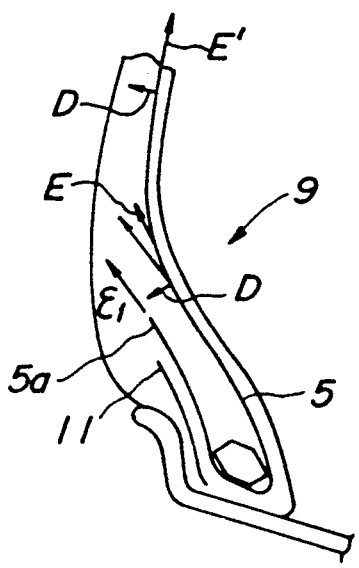
FIG_3
*PRIOR ART*
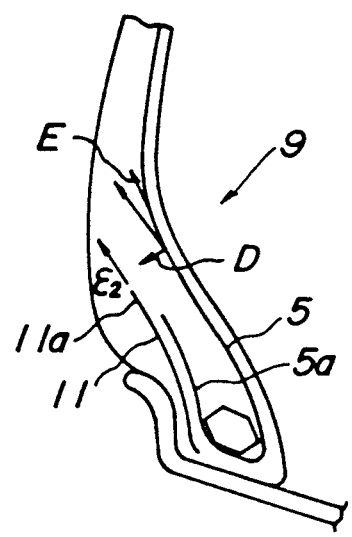

FIG_4
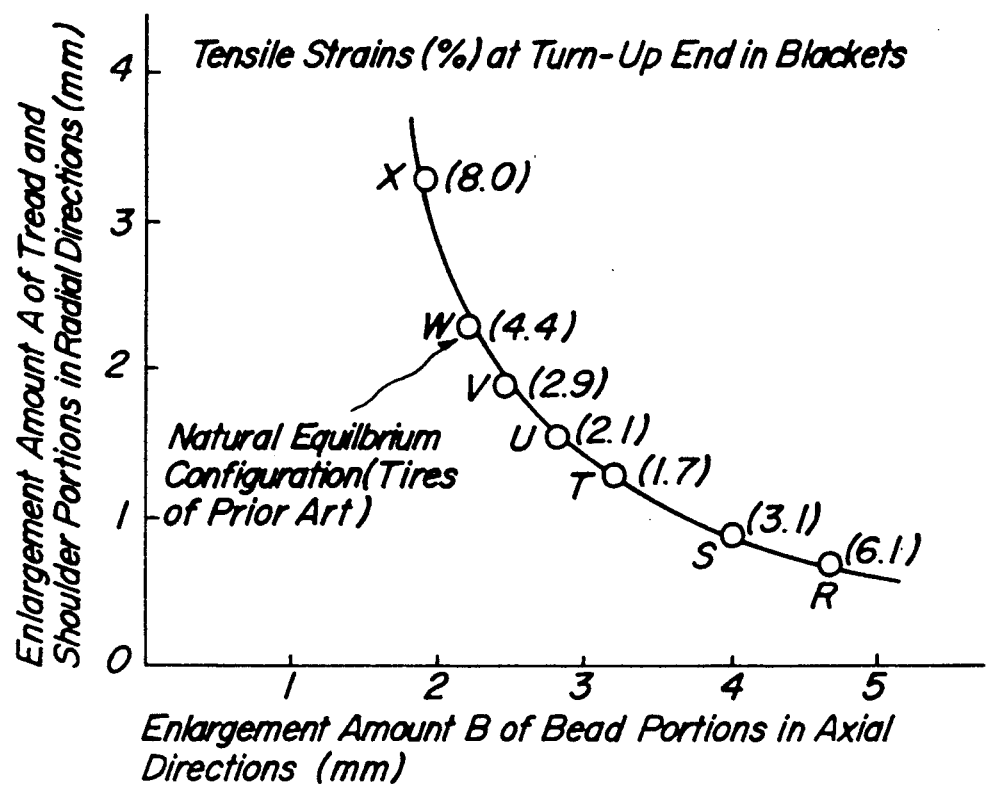
FIG_5
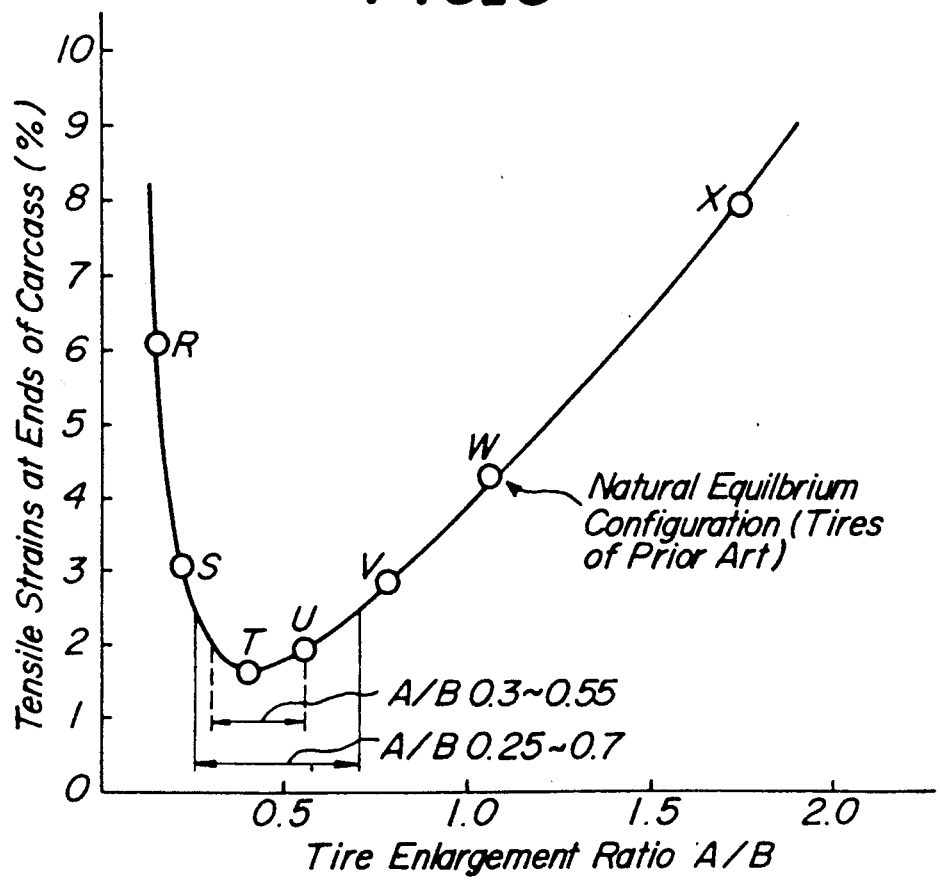

PRIOR ART

Solid Lines:
   Before Filling Inner Pressure
Broken Lines:
   After Filling Inner Pressure
(Primed Reference Numerals)

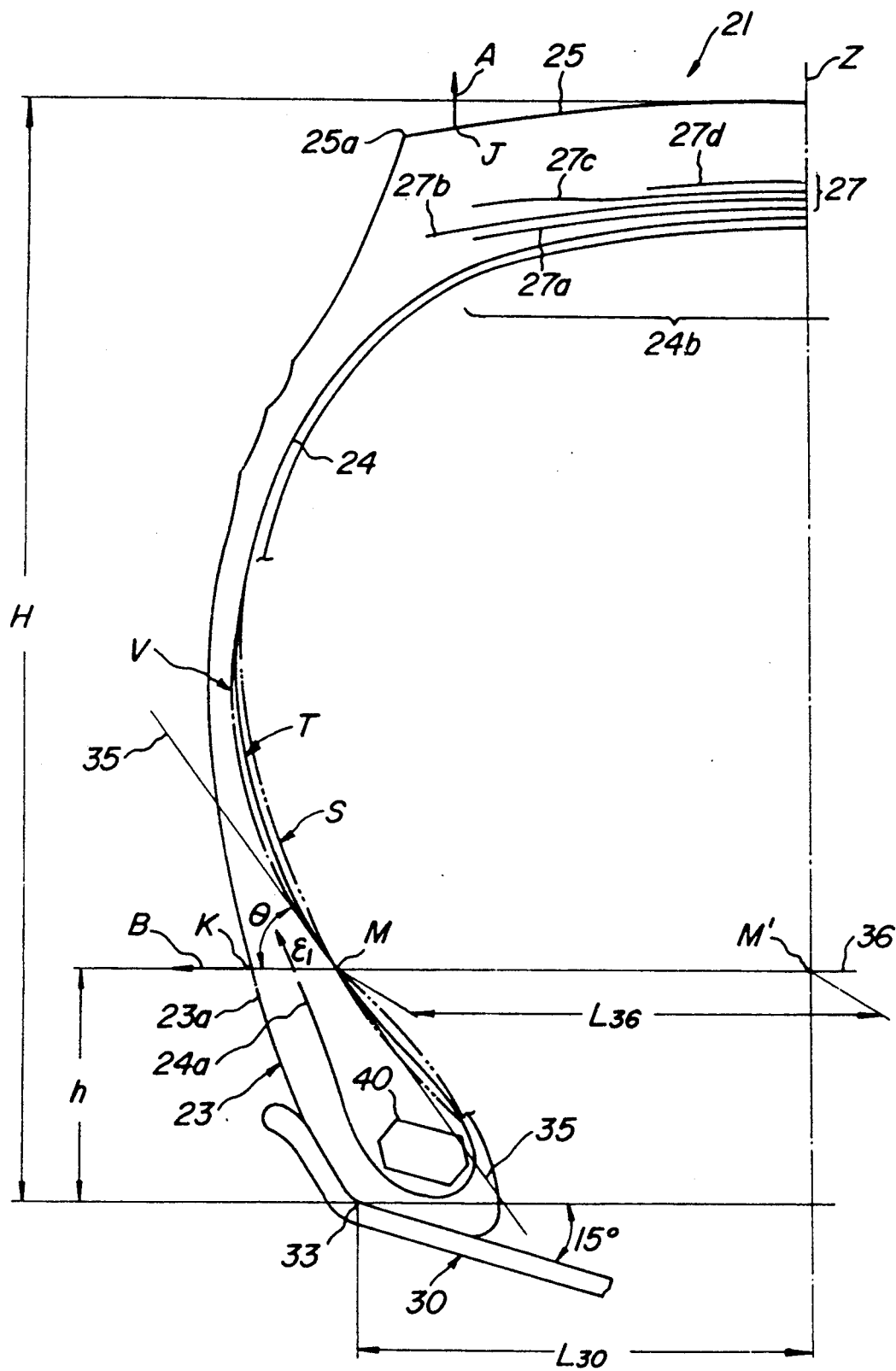
FIG_10

HEAVY DUTY PNEUMATIC RADIAL TIRE HAVING DEFINED TIRE ENLARGEMENT WITH INFLATION

This is a continuation of application Ser. No. 07/294,974, filed Jan. 3, 1989, now abandoned, which is a continuation of application Ser. No. 07/016,822, filed Feb. 20, 1987, now abandoned.

BACKGROUND OF THE INVENTION

This invention relates to a heavy duty pneumatic radial tire for use in trucks, buses or the like, and more particularly to a heavy duty pneumatic tire whose bead portions have improved durability.

In general, a pneumatic radial tire for use in trucks, buses or the like has a carcass consisting of a pair of bead portions and a steel cord layer and extending between the bead portions. When the pneumatic radial tire is filled with pneumatic pressure or inner pressure, the configuration of the carcass changes to be larger so that an outer surface of the tire becomes larger together therewith into a configuration similar to that of the enlarged carcass.

With the heavy duty pneumatic radial tire, particularly, the enlarging change in the carcass configuration or carcass line tends to be large because it is used with high inner pressure. The amount of enlargement is an important factor in designing a tire.

FIG. 1 illustrates one example of the enlarging change of a carcass line of a prior art heavy duty pneumatic radial tire 1. In FIG. 1, solid lines show a tire 2 prior to filling with inner pressure and broken lines 3a denote outer surfaces of the tire 3 after filled with inner pressure. A thick solid line 5b–5c illustrates a carcass line 5 before it is filled with the air pressure. A thick broken line 7b–7c shows a carcass line 7 after filled with a predetermined maximum inner pressure. In the heavy duty pneumatic radial tire of the prior art, as shown in FIG. 1, an enlargement amount d5 of the carcass line 5b–5c in normal directions N thereof and an enlargement amount d2 of the outer surfaces 2a of the tire 2 are substantially uniform, respectively, from a crown portion 8 to bead portions 9. In other words, such a tire is designed in a so-called "natural equilibrium configuration".

In the tire designed in the natural equilibrium configuration according to the prior art, however, the bead portions do not exhibit enough durability to be used under severe conditions particularly recently required or repeatedly used as a base tire, so that the tire tends to cause failure in the bead portions for a short period of time.

It has been known that large tensile strains $\epsilon_1$ occur in the rubber in the proximity of an outer end of a turn-up end 5a of the carcass 5 in the bead portion 9 as shown in FIG. 2 and repeatedly acts on the rubber in continuous running of a vehicle to cause fatigue of the rubber, which in turn causes separation of the rubber from cords resulting in the failure of the bead portion.

In order to protect the turn-up end 5a of the carcass 5, a wire chafer 11 is sometimes provided extending radially outwardly of the turn-up end 5a as shown in FIG. 3 illustrating a prior art tire bead portion. With this case, however, large tensile strains $\epsilon_2$ occur end 11a of the wire chafer 11 so that continuous running of a vehicle finally causes a failure of the bead portion in the same manner as in the above description.

In order to avoid such troubles of the bead portions, it has been proposed to modify the constitution of the chafer in the bead portion or to replace rubber materials in the proximity of the turn-up end 5a of the carcass 5 or the end 11a of the wire chafer 11. However, such modifications do not reduce the strains themselves when filled with the inner pressure, so that these proposals do not fundamentally solve the problems and do not achieve satisfactory results.

In the case of that shown in FIG. 3 providing the wire chafer 11 extending radially outwardly of the turn-up end, the phenomenon occurring in the turn-up end 5a of the carcass shown in FIG. 2 still occurs in the end 11a of the wire chafer instead of the turn-up end.

SUMMARY OF THE INVENTION

It is an object of the invention to provide an improved heavy duty pneumatic radial tire, which eliminates all the disadvantages of the prior art above described and whose bead portions are greatly improved in durability.

In order to achieve this object, in a heavy duty pneumatic radial tire including a pair of bead portions, a carcass consisting of one steel cord layer and extending between said bead portions, and a tread portion arranged radially outward of a crown portion of said carcass, said tire to be mounted on a normal rim having a bead seat at an angle of approximately 15° relative to a rotating axis of said tire and engaging said bead portions of said tire, according to the invention a tire enlargement ratio A/B lies within A/B=0.25–0.7, where A is an enlargement amount of a shoulder in radial and outward directions corresponding to a radial and outward displacement of a shoulder position J on the shoulder spaced by 10 mm from each end of said tread toward an equatorial plane of the tire during filling inner pressure from 7% to 100% of a determined maximum inner pressure of the tire and B is an enlargement amount of each bead portion in axial outward directions corresponding to an axial outward displacement of a bead position K on the bead portion at a height of 21% of a tire sectional height H from a bead heel during the filling of the inner pressure from 7% to 100% of the maximum inner pressure of said tire.

In a preferred embodiment of the invention, the tire enlargement ratio A/B lies within A/B=0.3–0.55.

In both cases of the tire enlargement ratio A/B less than 0.25 or more than 0.7, tensile strains at ends of the carcass become larger to obstruct the accomplishment of the effect of the invention.

The heavy duty pneumatic radial tire according to the invention mounted on a normal rim having a bead seat inclined at about 15° relative to a rotating axis of the tire is filled with inner pressure from 7% to 100% of the determined maximum inner pressure, during which the shoulder portions and bead portions are enlarged in radial outward and axial outward directions, respectively. The tire enlargement ratio A/B lies in the range of 0.25–0.7. As later explained, tensile strains (%) at ends of turn-up portions of the carcass are greatly reduced to less than (2.5%) in comparison with those (4.4%) of the prior art, so that in spite of continuous running at high speeds under heavy loads, the fatigue in the proximity of the ends of the turn-up portions is prevented to remarkably increase the durability at the bead portions.

In order that the invention may be more clearly understood, preferred embodiments will be described, by way of example, with reference to the accompanying drawings.

BRIEF DESCRIPTION OF THE DRAWINGS

FIG. 1 is a schematic view of a tire of the prior art showing enlargements of outer surfaces of the tire and its carcass line;

FIG. 2 is a partial sectional view of the tire shown in FIG. 2 showing enlargements of axial and radial directions;

FIG. 3 is a partial sectional view of a prior art tire having wire chafers at bead portions;

FIG. 4 is a graph illustrating relations between kinds (R-X) of tire deformations and enlargements A and B of tread and shoulder portions in radial directions and bead portions in axial directions;

FIG. 5 is a graph illustrating relations between kinds (R-X) of tire deformations, tensile strains at carcass ends and tire enlargement ratio;

FIG. 10 is a sectional view of a quarter of a tire illustrating carcass lines of the first embodiment of the invention and the one reference example.

DESCRIPTION OF THE PREFERRED EMBODIMENTS

In order to clarify why the large tensile strains occur in the proximity of the turn-up portion of a carcass of a tire designed in the natural equilibrium configuration according to the prior art, the inventors of the present application have studied in detail the enlarging deformation in the configuration of the carcass in bead portions when filling the tire with inner pressure. They have found the following facts.

Referring to FIG. 2, in the bead portion, amount of enlargement D of the carcass 5 at respective points thereon in normals thereof are small and constant, while on the other hand, amount of enlargement E of the carcass in tangential directions thereof are considerably large in comparison with the amount D. As a result, the actual resultant amount of enlargement consisting of these enlargement components becomes naturally large which is a cause for increasing the tensile strains in the proximity of the outer end of the turn-up end 5a of the carcass 5. The outer surfaces of the tire at respective points thereon are of course enlarged in the same manner as in the carcass.

On the basis of the above discovery the inventors have further investigated the enlargement of the tire. As a result, the inventors have found that the amounts of enlargement of the carcass in the bead portion in tangential directions are in proportion to amounts of enlargement of the carcass in tread and shoulder portions in normal directions of the carcass, and that in the natural equilibrium configuration according to the prior art, the amounts of enlargement of the carcass in the tread and shoulder portions in normal directions of the carcass are on substantially the same level as the amounts of enlargement of the carcass in the bead portion in normal directions of the carcass. In view of these facts, it has been conceived that it may be possible to reduce the amounts of enlargement of the carcass in the normal directions thereof in both the areas or the tensile strains at the turn-up portion of the carcass.

Figure 6:
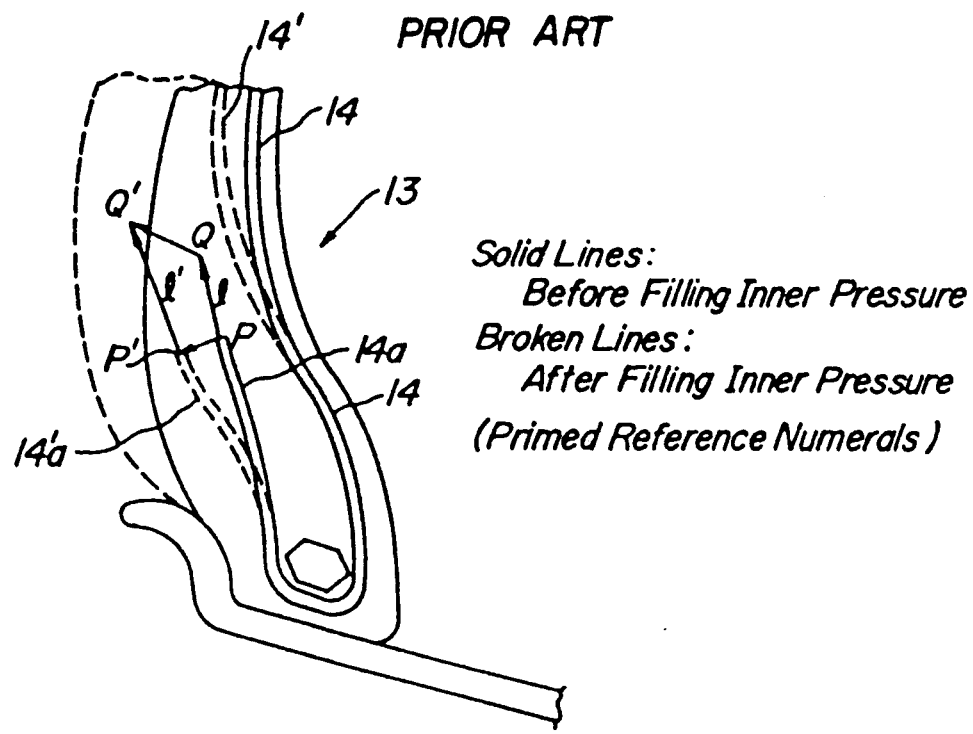
FIG. 6 is an enlargement conceptual view illustrating deformations of ends of turn-up portions of the carcass of a prior art tire after filled with inner pressure.

This fact is in coincidence with a result of theoretical calculation according to an equation $\epsilon_1 = (l'/l) - 1$ which approximately indicates the tensile strain $\epsilon_1$. In other words, it has been concluded that the tensile strains at the turn-up end of the carcass rely upon the amounts of enlargement of the carcass in normal directions in both the tread and shoulder portions and bead portion. FIG. 6 schematically illustrates a prior art a tire having displacements of a carcass 14 in the proximity of a turn-up end 14a of the carcass 14 in a bead portion 3 after filled with inner pressure. In the drawing, reference numerals 14', 14a', P' and Q' illustrate displaced positions of the carcass 14, the turn-up end 14a, a distal end P of the turn-up end and a point Q near to the distal end P which are expected after filled with inner pressure.

On the basis of the above results of the investigation, the inventors have carried out experiments to ascertain relations between enlargement amounts in tread and shoulder portions and bead portion and between tensile strains in tread and shoulder portions and bead portion. The results are shown in FIGS. 4, 5, 8 and 9. The enlargement amounts are measured at outer surfaces of tires without measuring carcasses themselves because the outer surfaces are easily measured. In this case, the enlargement amounts at the outer surfaces of the tread and shoulder portions in radial directions substantially correspond to the enlargement amounts of the carcass in normal directions thereof in the tread and shoulder portions, and the enlargement amount at the outer surface in the bead portions in axial directions of the tire substantially correspond to the enlargement amounts of the carcass in normal direction thereof in the bead portions. In order to realize various displacements (R-X), materials of rubber or cords and internal constructions of the tire, themselves, may be changed. In this experiment, however, such displacements were realized only by changing carcass lines or carcass tangential angles $\theta$ which will be explained later. By changing the carcass tangential angles $\theta$, the enlargement amounts at respective positions are changed in the simplest manner.

FIGS. 4 and 5 illustrate the tensile strains occurring at turn-up ends, enlargement amounts A and B of tires and kinds (R-X) of displacements of the tires before and after filled with inner pressure. In this case, the enlargement amount A is an enlargement amount of tread and shoulder portions in a radial direction which is a radially outward displacement of a joint J (FIG. 7) on an outer surface of the tread portion, which point J is at a distance 10 mm spaced from a side edge 25a of the tread portion inwardly toward an equatorial plane of the tire, during the time required to fill in the tire with air pressure from 7% of the normal maximum pressure to full 100% of the normal maximum pressure. On the other hand, the enlargement amount A is an enlargement amount of bead portion in axial displacement of a point K on an outer surface of the bed portion, which point K is at a height h, 21% of a tire sectional height H during the above time.

Figure 7:
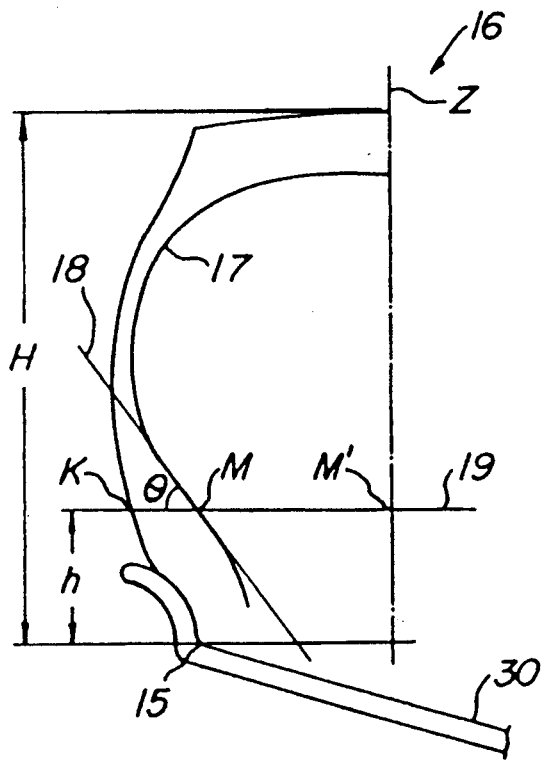
FIG. 7 is a conceptual view of a tire illustrating relations between a position M on a carcass line 17, carcass tangential angle $\theta$ and width $L_{30}$ of a rim.
Figure 8:
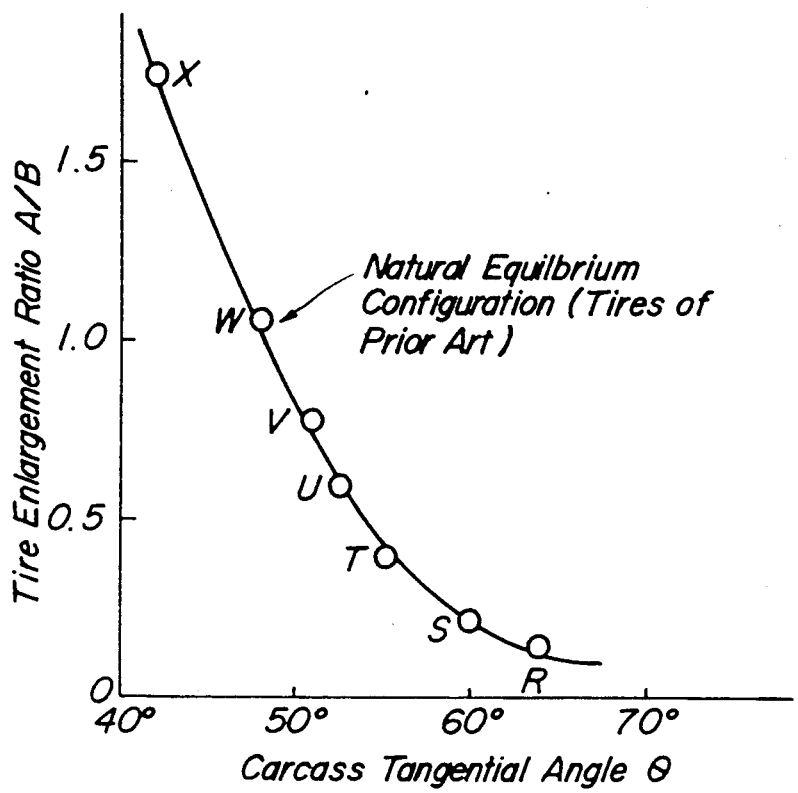
FIG. 8 is a graph illustrating relations between the kinds (R-X) of tire deformations, tire enlargement ratio A/B and carcass tangential angle $\theta$.
Figure 9:
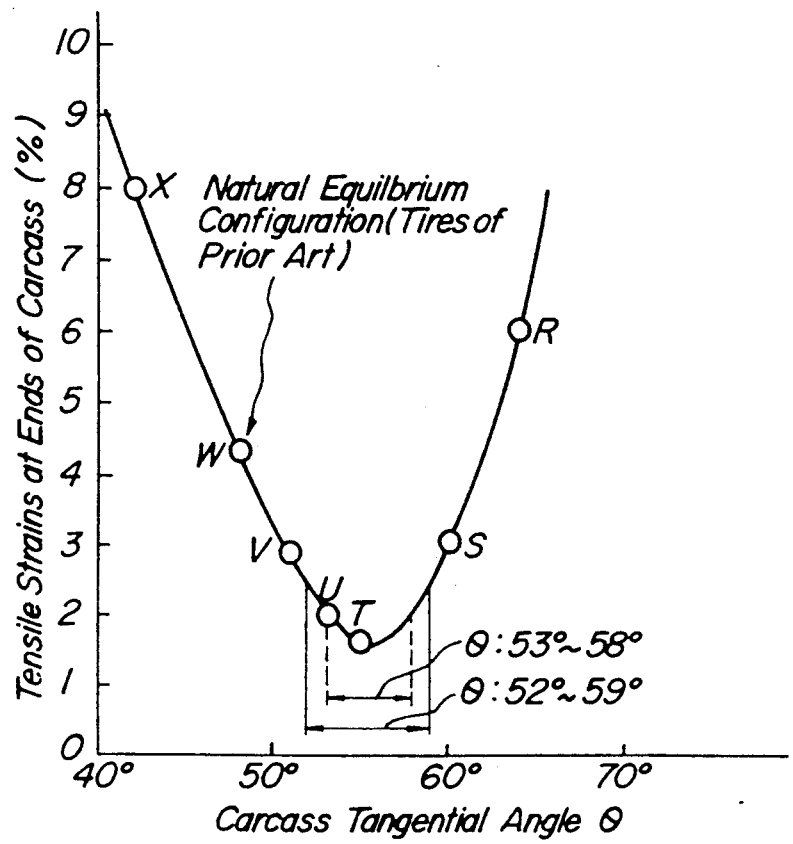
FIG. 9 is a graph illustrating relations between the kinds (R-X) of tire deformations, tensile strains and carcass tangential angle $\theta$.

FIGS. 7, 8 and 9 illustrate relations between a carcass tangential angle $\theta$ at a point M on a carcass line 17 of a tire 16 when filled with air pressure 7% of a predetermined maximum inner pressure, the above tensile strains $\epsilon_1$ (%), tire enlargement ratio A/B and kinds (R-X) of tire deformation. The carcass tangential angle $\theta$ is an (acute) angle made by a line 19 in parallel with a rotating axis of the tire and a tangential line 18 to the carcass line 17 at the point M which is at a height of 21% of the tire sectional height H.

FIG. 8 illustrates relations between the carcass tangential angle and the tire enlargement ratio A/B. FIG. 9 corresponds to FIG. 5.

In the above explanation, respective members of the tire are explained referring to a quarter of the section of the tire.

Conclusions obtained from these results are summarized as follows.

(1) As shown in FIGS. 4 and 5, the enlargement amount A of tread and shoulder portions in radial directions and the enlargement amount B of bead portions in axial directions are substantially equal to each other in the natural equilibrium configuration of the prior art. By increasing the enlargement amount B of the bead portions in the axial directions and decreasing the enlargement amount A of the tread and shoulder portions in radial directions deviating from such a natural equilibrium configuration, the tensile strains $\epsilon_1$ of the kinds of the tires R, S and T are reduced. (2) However, the tensile strains $\epsilon_1$ are again increased by further increasing the enlargement amount B and further reducing the enlargement amount A too far, as shown in case of the kinds of the tires S and R.

(3) As shown in FIG. 5, when the tire enlargement ratio A/B is 0.25–0.7 and more preferably 0.3–0.55, the tensile strains are sufficiently small.

(4) The carcass tangential angle corresponding to the above tire enlargement ratio A/B bringing about the good results is 52°–59°, more preferably 53°–57° from FIGS. 8 and 9.

The present invention resides in the above conclusion. A heavy duty pneumatic radial tire according to the invention is mounted on a normal rim whose bead seat is inclined relative to a rotating axis of the tire at about 5° and filled with pneumatic pressure of 7% of the normal maximum inner pressure and thereafter further filled with pneumatic pressure to the normal maximum inner pressure. During the filling of the tire from an inner pressure from 7% to the maximum pressure, shoulders and bead portions are enlarged in radial and axial directions of the tire, respectively. In this case, the tire enlargement ratio A/B is within 0.25–0.7. Accordingly, tensile strains % at ends of turn-up portions of a carcass are considerably reduced to values less than about 2.5% in comparison with those (4.4%) of the prior art natural equilibrium configuration tire as shown in FIG. 2. The tire according to the invention therefore exhibits only very slight fatigue in the proximity of ends of the turn-up portions to remarkably increase durability of the bead portions, even if a vehicle equipped with the tires runs continuously at high speeds under a heavy load.

FIG. 10 illustrates a first embodiment of the heavy duty pneumatic radial tire according to the invention. The pneumatic radial tire 21 (Tire size: 11R22.5) comprises a pair of bead portions 23, a carcass 24 consisting of a steel cord layer whose steel cords are arranged radially of the tire and extending between the bead portions 24, and a tread portion 25 arranged radially outwardly of a crown portion 24a of the carcass 24. The carcass 24 includes turn-up portions 24a each being folded about a bead wire 40 at the bead portion 23. Between the tread portion 25 and the carcass is provided a belt 27 which comprises first to fourth belt layers 27a-27d, whose steel cords are directed at angles 67°, 18°, 18° and 18° relative to circumferential directions of the tire, respectively. The steel cords of the second and third belt layers are crossed in a manner inclined in opposite directions relative to the circumferential directions. The carcass line of the pneumatic radial tire 21 is determined so that the engagement amount ratio A/B of the enlargement amount A of the tread and shoulder portions in radial directions to the enlargement amount B of the bead portions in axial directions is that as later described. The construction of the tire except these features is similar to those of convention tires.

The pneumatic radial tire 21 was mounted on a regular rim (rim size 8.25×22.5) 30. The bead seat 31 of the rim 30 engaging the bad portions 23 were at approximately 15° relative to a rotating axis (not shown) of the tire. Then the tire was filled with pneumatic pressure 0.49 kg/cm² which was 7% of the normal maximum inner pressure 7.0 kg/cm² and further filled with pneumatic pressure to the maximum pressure 7.0 kg/cm². An enlargement amount A in the radial direction corresponded to a radial outward displacement of a shoulder point J which was located on the tread portion 25 spaced from one end 25a of the tread portion 25 by 10 mm toward an equatorial plane. An enlargement amount B in the axial direction corresponded to an axial outward displacement of a bead portion point K which was located on the bead portion 23 at a height h which is 21% of a tire sectional height H. During such a filling of the inner pressure from 7% to 100% of the maximum, the enlargement amount A was 1.28 mm and the enlargement amount B was 3.2 mm. The tire enlargement ratio A/B was 0.40 which was within the range of the equation A/B=0.25–0.7. The tensile strain $\epsilon_1$ occurring on outer side of end 24a of the turn-up portion of the carcass 24 was 1.7% as shown in FIG. 5. This value of the tensile strain $\epsilon_1$ is substantially the minimum value and is much smaller than the tensile strain of 4.4 % of the tire having a natural equilibrium configuration according to the prior art.

Moreover, the carcass tangential angle was 60° which was an acute angle formed by a tangent 35 to the carcass line 24 at a point M at a height h which is 21% of the tire sectional height H with a line 36 passing through the point M in parallel with the rotating axis of the tire. This tangential angle 55° was larger than a tangential angle 48° of the carcass of the tire of the prior art shown in FIG. 9. The tensile strain $\epsilon_1$ at the end 24a of the turn-up portion was 1.7% which is the minimum among those shown in FIG. 9. The carcass tangential angle $\theta$ is preferably 52°–59°, more preferably 53°–48°. Any carcass tangential angle less than 52° or more than 59° causes the tensile strain $\epsilon_1$ to increase, which obstructs the accomplishment of the effect of the invention. In other words, the tensile strain $\epsilon_1$ is made small by bringing the tire enlargement ratio A/B into the range of 0.25–0.7, and such a range of the enlargement ratio A/B is accomplished by the carcass tangential angle of 52°–59°.

A distance $L_{36}$ between the point M on the carcass line and a point M′ which is a point of intersection of the line 36 and an equatorial plane Z is preferably 90%–110%, and more preferably 95%–105% of one half $L_{30}$ of a width of the rim.

Although the belt 27 consisting of the four layers has been shown in the above embodiment, this is only by way of example, and the belt could be formed by at least two steel cord layers in the present invention. Moreover, although the belt 27 having the four steel cord layers whose cords are at 18° and 67° relative to the circumferential directions has bene explained in the above embodiment, at least one or two steel cord layers may include steel cords having angle of substantially 0° or of the order of 0°-5° relative to the circumferential directions.

In the above embodiment, moreover, the carcass 24 extends between the bead portions 23 and is folded about the bead wires from the inside to the outside. In this embodiment, the chafer consists of three-layer nylon chafers (not shown). Instead of such a chafer, one-layer chafer may be arranged outside of the carcass 24 and further two-layer nylon chafers may be arranged outside thereof to reinforce them over the bead portion 23. The bead portions except the carcass may be modified into various constructions. At any rate, such modifications are acceptable so long as the proper tire enlargement ratio A/B as above described can be obtained.

Moreover, seven kinds of tires (two kinds for embodiments and five kinds for reference examples) of the size 11R22.5 were prepared to ascertain the effect of the invention. The first embodiment tire was similar to that shown in FIG. 10. Details of other tires are shown in the following table. Constructions of the tires other than those shown in this table are substantially the same as those of the first embodiment tire. They were manufactured in the same manner as in the first embodiment tire.

In testing these tires, a usual drum testing machine was used in a laboratory. Each tire was urged by a predetermined load against a drum rotating at a predetermined speed to continuously drive the tire. A running distance of the tire until a bead portion fails was measured. REsults are indicated in Table by indexes in case that running distance of the tire of Reference Example 3 is assumed as 100. Larger indexes shown better results.

gated as the result of the improved durability of the bead portions.

As above described, with the tire according to the invention, the tensile strains at ends of carcass in the bead portions are very small with resulting less chance of failure of the bead portions, thereby greatly improving the durability of the bead portions.

It is further understood by those skilled in the art that the foregoing description is that of preferred embodiments of the disclosed tires and that various changes and modifications may be made in the invention without departing from the spirit and scope thereof.

What is claimed is:

1. A heavy duty pneumatic radial tire including a pair of bead portions, a carcass consisting of one steel cord layer and extending between said bead portions, and a tread portion arranged radially outward of a crown portion of said carcass when, said tire is mounted on a normal rim for said tire having a bead seat at an angle of approximately 15° relative to a rotating axis of said tire and engaging said bead portions of said tire, that, a tire enlargement ratio A/B lies within A/B=0.25-0.7, wherein A is an enlargement amount of a shoulder in radial and outward directions corresponding to a radial and outward displacement of a shoulder position J on the shoulder spaced by 10 mm from each end of said tread toward an equatorial plane of the tire during filling inner pressure from 7 to 100% of a determined maximum inner pressure of the tire and B is an enlargement amount of each bead portion in axial outward directions corresponding to an axial outward displacement of a bead position K on the bead portion at a height of 21% of a tire sectional height H from a bead heel during the filling of the inner pressure from 7 to 100% of the maximum inner pressure of said tire, and wherein a carcass tangential angle $\theta$ is within a range of 52°-59° at a height of 21% of the tire sectional height H from the bead heel when said tire is inflated to 7% of its maximum inner pressure.

2. A heavy duty pneumatic radial tire as set forth in claim 1, wherein said tire enlargement ratio A/B lies within A/B=0.3-0.55.

TABLE

|  | Reference example 1 | Reference example 2 | First embodiment of the invention | Second embodiment of the invention | Reference example 3 | Reference example 4 | Reference example 5 |
|---|---|---|---|---|---|---|---|
| Kind of tire in drawings | R | S | T | U | V | W* | X |
| Enlargement amount A of tread and shoulder portions in radial directions (mm) | 0.70 | 0.88 | 1.28 | 1.52 | 1.91 | 2.33 | 3.31 |
| Enlargement amount B of bead portions in axial directions (mm) | 4.67 | 4.00 | 3.20 | 2.77 | 2.45 | 2.20 | 1.90 |
| Tire enlargement ratio A/B | 0.15 | 0.22 | 0.40 | 0.55 | 0.78 | 1.06 | 1.74 |
| Tensile strain at carcass end $\epsilon_1$ (%) | 6.1 | 3.1 | 1.7 | 2.1 | 2.9 | 4.4 | 8.0 |
| Carcass tangential angle in tire section $\theta$ (°) | 64 | 60 | 55 | 53 | 51 | 48 | 42 |
| Running distance until failure | 69 | 91 | 122 | 112 | 100 | 82 | 59 |

Note: W*: Tire of prior art

As can be seen from the results in the Table, with the tires of the first and second embodiments of the invention, the running distances until failure are greatly elongated 3. A heavy duty pneumatic radial tire as set forth in claim 1, wherein said carcass layer is wrapped around each of said bead portions from inside to outside.

4. A heavy duty pneumatic radial tire as set forth in claim 1, further comprising a belt portion interposed between said carcass and said tread portion.

5. A heavy duty pneumatic radial tire as set forth in claim 4, wherein said belt portion comprises four belt layers arranged outward from said carcass at angle of 67°, 18°, 18°, and 18° with respect to the circumferential direction of the tire.

6. A heavy duty pneumatic radial tire as set forth in claim 5, wherein the middle two belt layers are crossed with each other.

* * * * *